United States Patent [19]
Etue

[11] Patent Number: 6,062,518
[45] Date of Patent: May 16, 2000

[54] CELLULAR PHONE RETAINER UTILIZING A CUP HOLDER

[75] Inventor: T. Gerald Etue, Birmingham, Mich.

[73] Assignee: United Global Sourcing Incorporated, Troy, Mich.

[21] Appl. No.: 08/859,232

[22] Filed: May 20, 1997

[51] Int. Cl.[7] .................................................. A47B 96/06
[52] U.S. Cl. ................................ 248/231.21; 248/309.1; 248/229.21; 224/542
[58] Field of Search .................................. 224/929, 544, 224/545, 550, 556, 542; 379/454, 446, 447, 449, 450, 455, 448, 457, 426, 428, 424; 248/309.1, 311.2, 313, 213.2, 229.11, 229.12, 316.3, 316.4, 316.6, 316.8, 154, 346.07, 229.21, 310

[56] References Cited

U.S. PATENT DOCUMENTS

| | | | |
|---|---|---|---|
| 1,995,656 | 3/1935 | Stout | 248/292.12 |
| 3,163,722 | 12/1964 | Gomez | 379/449 |
| 3,601,295 | 8/1971 | Lowe | 224/42.45 R |
| 4,058,689 | 11/1977 | Stebinger | 179/157 |
| 4,560,831 | 12/1985 | Bast | 179/2 E |
| 5,033,709 | 7/1991 | Yuen | 248/313 |
| 5,100,091 | 3/1992 | Pollak | 248/278 |
| 5,390,609 | 2/1995 | McKee | 108/45 |
| 5,490,653 | 2/1996 | Ingwersen | 248/311.2 |
| 5,492,068 | 2/1996 | McKee | 108/44 |
| 5,533,700 | 7/1996 | Porter | 248/311.2 |
| 5,551,616 | 9/1996 | Stitt et al. | 224/275 |
| 5,560,578 | 10/1996 | Schenken et al. | 248/313 |
| 5,568,549 | 10/1996 | Wang | 379/446 |
| 5,573,164 | 11/1996 | Law | 224/483 |

*Primary Examiner*—Leslie A. Braun
*Assistant Examiner*—Gwendolyn Baxter
*Attorney, Agent, or Firm*—Gifford, Krass, Groh, Sprinkle, Anderson & Citkowski, P.C.

[57] ABSTRACT

The invention relates generally to a device for retaining a cellular phone in an automotive interior utilizing an existing cupholder. The device includes a base with a top portion and one or more downwardly extending gripping members for gripping the side wall of a cupholder. A bracket for retaining a cellular phone is supported on the base. The device preferably includes an elongated extension extending upwardly from the top portion of the base and terminating in an adjustable connector which supports the retaining bracket. The downwardly extending gripping members preferably are adjustable to allow the device to accommodate a variety of cupholders.

10 Claims, 4 Drawing Sheets

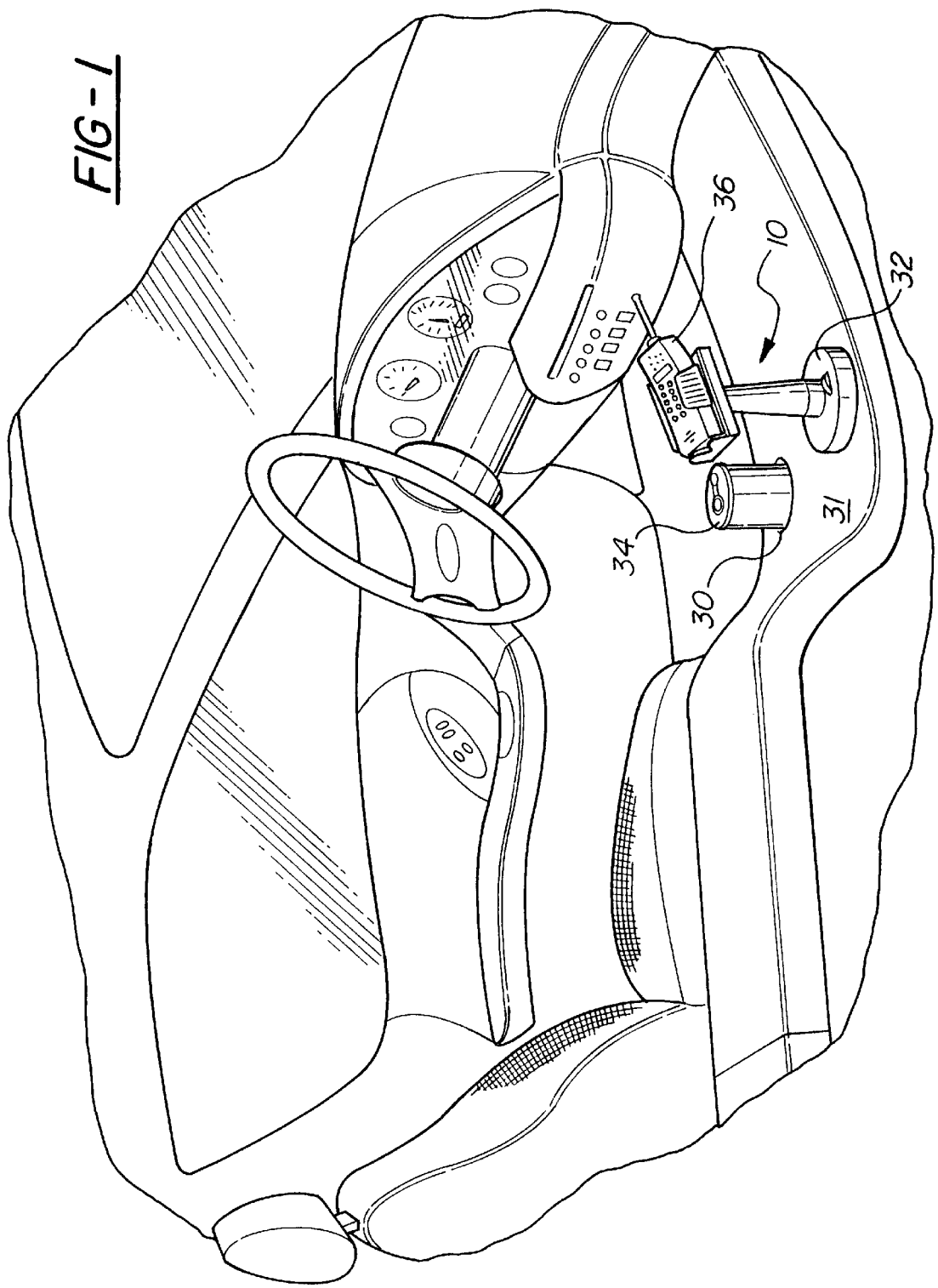

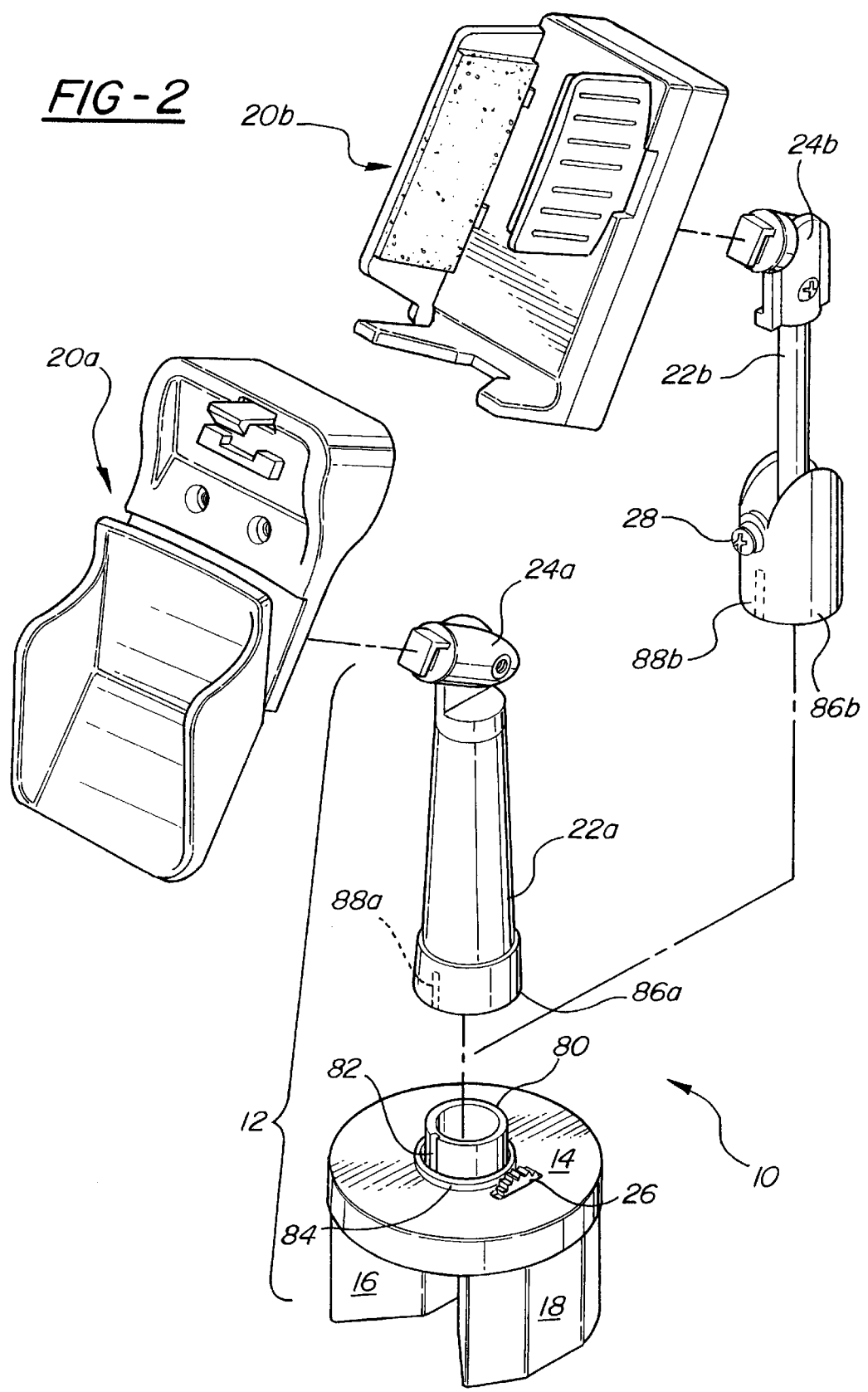

CELLULAR PHONE RETAINER UTILIZING A CUP HOLDER

FIELD OF THE INVENTION

This invention generally relates to a device for retaining a cellular phone in an automotive vehicle interior and more specifically to a cellular phone retainer that utilizes an existing cup holder in a vehicle interior.

BACKGROUND OF THE INVENTION

Portable communication devices such as cellular phones, satellite phones, and radio phones, are becoming increasingly popular. Many persons carry a portable communications device in their automobile with them and may wish to use the device while operating the car. Consequently a variety of accessories have been developed to make it more convenient for people to carry a portable communication device with them and to use that device while in an automobile.

One approach is to install a speaker phone type communication device in the interior of the vehicle so that the device may be used "hands-free." Such a system may include a voice activated dialer to allow telephone calls to be made without the driver using their hands. These devices suffer from the drawback that they are high in cost and usually are permanently installed in a vehicle. To use the same device in a different vehicle would require extensive removal and reinstallation of the device.

Hand-held portable cellular phones are a particularly popular type of portable communication device. These phones are small enough to hold completely in one hand and can be carried with the user by placing the phone in a pocket or purse. A variety of brackets are available for mounting a cellular phone in an automotive interior. Ideally such a device would be easily installed and removed, low in price, and position the cellular phone in a convenient location. Most brackets currently on the market do not meet these three requirements. Some brackets require permanent installation of a plate to the floor or console of the vehicle. Other brackets position the cellular phone where it is not easily within reach of the vehicle occupants. If the phone is not easily reachable from the drivers and passenger seat, using the phone may present a hazard.

Most newer automobiles come factory equipped with cup holders designed to hold soft drink cans, coffee cups, paper cups and the like. Automotive vehicle interior designers strive to place cup holders within easy and convenient reach of the driver. Ideally, a cup holder is positioned such that the driver can remove and replace a beverage container without removing their eyes from the road.

Currently many users of portable cellular phones, in looking for a convenient place to put the phone while not in use, place the phone on the drivers seat or in the glove box.

There is a need for a device for retaining a cellular phone in an automotive vehicle interior that is easy to install and remove, low in price, and positions the phone in a convenient position for use by the driver while operating the vehicle. Further, there is a need for a cellular phone retainer that utilizes an existing cup holder in a vehicle interior to position a phone within convenient reach.

SUMMARY OF THE INVENTION

The present invention relates generally to a device for releasable retaining a cellular phone in an automotive vehicle interior utilizing an existing cup holder to place the cellular phone in a convenient position for use while operating the vehicle. Broadly, the device includes a base which can be disposed at least partially within a cup holder. The base includes a top portion and at least one downwardly extending gripping member which is configured to grip the sidewall of the cup holder thereby securing the device to the cup holder. The device further includes a bracket for releasable retaining the cellular phone. The bracket is supported by the base thereby positioning the cellular phone in a convenient position.

In the preferred embodiment, the base of the device includes an elongated extension extending upwardly from the top portion. The elongated extension is detachably connected to the top portion at one of its ends, and supports the cellular phone retaining bracket at its other end. The bracket is connected to the elongated extension by an adjustable connector so that the cellular phone can be rotated relative to the device for optimally positioning the phone. A variety of elongated extensions are envisioned allowing for various ideal positions of the cellular phone relative to an existing cup holder.

In the preferred embodiment, the base includes two downwardly extending gripping members which are both configured for gripping the sidewall of the cup holder. One of the gripping members is adjustably attached to the top portion of the base so that the gripping member can be moved inwardly and outwardly relative to the perimeter of the top portion of the base. The position of the adjustable gripping member is adjusted by an adjusting wheel which turns a threaded shaft which engages an attachment portion of the adjustable member.

Other objects, advantages and applications of the present invention will be made clear by the following detailed description of a preferred embodiment of the invention. The description makes references to drawings in which:

BRIEF DESCRIPTION OF THE DRAWINGS

FIG. 1 is a perspective view of the interior of a vehicle showing a preferred embodiment of the device of the present invention installed in a cup holder;

FIG. 2 is a perspective view of the device of FIG. 1 that also shows an alternative elongated extension supporting an alternative retaining bracket;

DETAILED DESCRIPTION OF THE INVENTION

Figure 3:
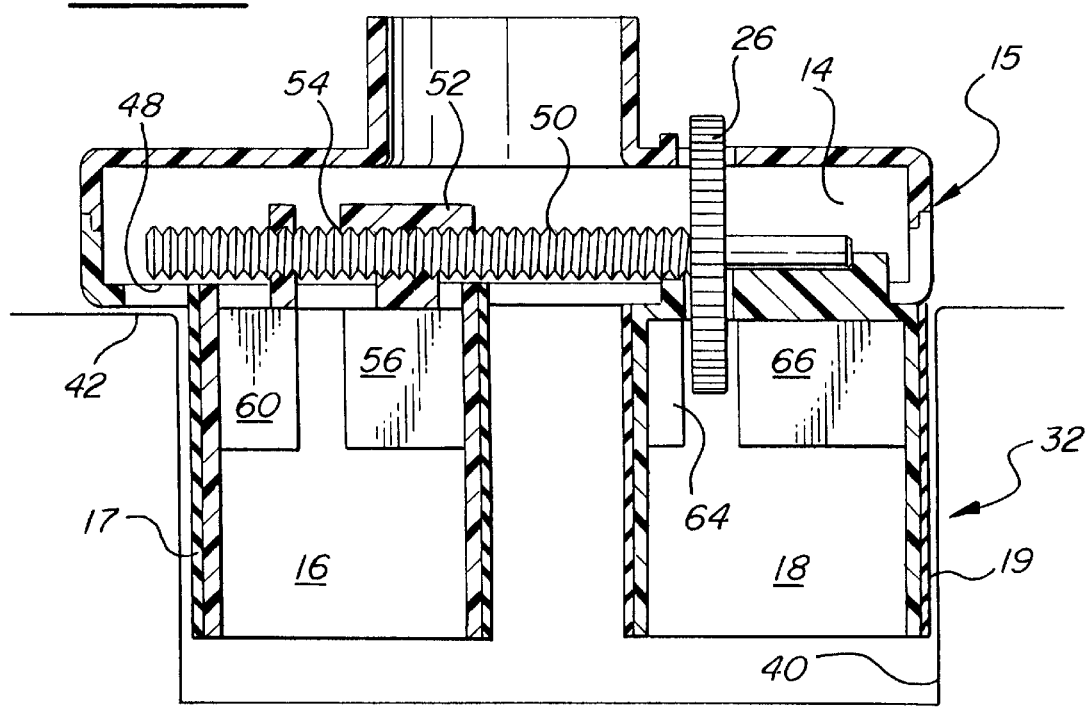
FIG. 3 is a cross-sectional view of the base of the device of FIG. 1.
Figure 6:
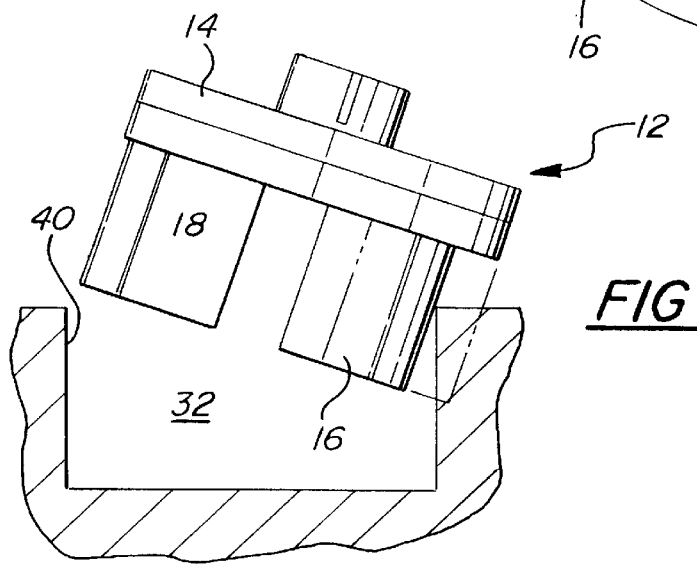
FIG. 6 is a front cutaway view of the base of the device of FIG. 1 as it is being inserted into a cupholder.

Referring to the drawings, FIG. 1 illustrates a preferred embodiment of the present invention constituting a device 10 installed in a cupholder 32 in a vehicle interior and retaining a cellular phone 36. The vehicle interior includes a first cup holder 30 and a second cup holder 32 located in positions within convenient reach of the vehicle operator. The device 10 is mounted in the second cupholder 32 thereby locating the cellular phone 36 in a convenient position. Cup holders come in many variations but all are designed to hold cylindrical beverage containers such as soft drink can 34 as well as coffee cups, glasses, and the like. Since cup holders are generally designed to hold cylindrical beverage containers, most include some type of circular cavity into which a container may be inserted. The device 10 is designed to grip the sidewall of a cavity. If the cup holder consists of a ring or loop extending from the dash, the cavity is defined by the inside of that ring or loop. If the cup holder 32 consists of a recess in the console 31, as shown in FIGS. 1, 3 and 6, the cavity is defined by that recess. The shown cup holder 32 defines a generally circular cavity with a sidewall 40.

Referring now to FIG. 2, the device 10 includes a base 12 having a top portion 14, two downwardly extending gripping members, 16 and 18, and an elongated extension 22a extending upwardly from the top portion 14 of the base 12. The elongated extension 22a connects at its lower end to the top portion 14 of the base 12 and connects at its upper end to an adjustable connector 24a. A bracket 20a for releasably retaining a cellular phone is supported by the adjustable connector 24a. Elongated extension 22a is shown detached from top portion 14. Top portion 14 includes an upwardly extending male plug 80 for connecting with the elongated extension 22a. The plug 80 includes a groove 82 and is surrounded by a ridge 84. The elongated extension 22a has an internal bore 86a sized for frictional fit with plug 80. The internal bore 86a also includes a rib 88a for engaging groove 82 to prevent relative rotation between the elongated extension 22a and top portion 14. Adjuster wheel 26 is part of an adjusting device for gripping member 16. A portion of wheel 26 extends out of top portion 14 so that a user may rotate the wheel 26 thereby adjusting gripping member 16.

Referring now to FIG. 3, a portion of the base 12 is shown installed in a cup holder 32 with gripping members, 16 and 18, gripping the sidewall 40 of the cup holder 32. Gripping members, 16 and 18, extend from top portion 14 generally at right angles to a plane containing the top portion 14. As shown, the top portion 14 is larger than the cup holder 32 and therefore may rest at least partially on the top edge 42 of the cup holder 32. Where a cup holder 32 is smaller than the top portion 14, the device 10 can obtain additional support by the top portion 14 resting on the top edge 42 of the cupholder 32.

Figure 5:
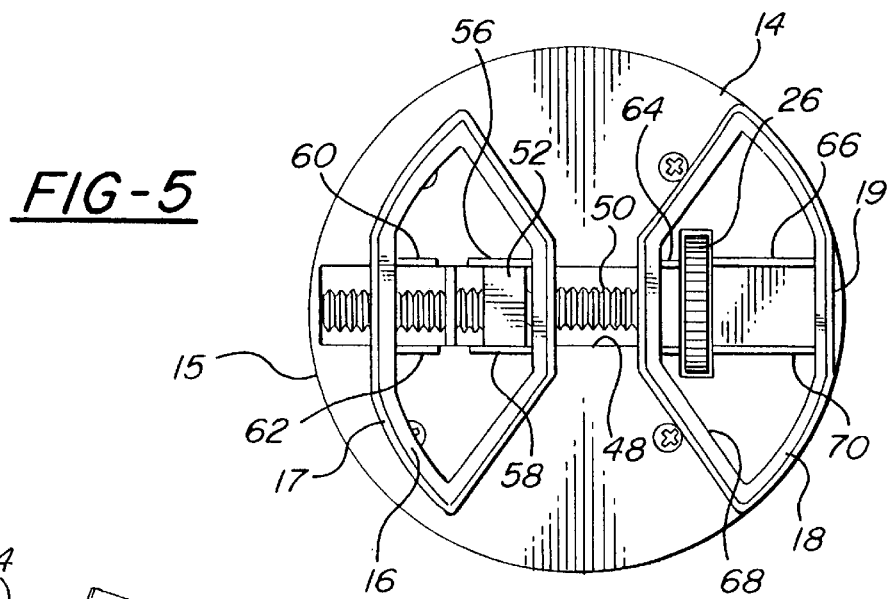
FIG. 5 is a bottom plan view of the device of FIG. 1.

Referring now to FIGS. 3 and 5, details of the adjusting device are shown. The adjusting device includes an externally threaded shaft 50 which is supported by the top portion 14 within a slot 48. The adjuster wheel 26 is connected to the shaft 50 for rotating the shaft 50. First gripping member 16 includes an adjuster attachment portion 52 with an internally threaded bore 54. The attachment portion 52 is connected to gripping member 16 by attachment ribs 56 and 58. As adjuster wheel 26 rotates shaft 50, attachment portion 52 is forced to move thereby moving gripping member 16. Rotating adjuster wheel 26 changes the position of gripping member 16 relative to the perimeter 15 of the top portion 14. This allows the gripping members, 16 and 18, to adjust to and engage the sidewall 40 of cup holders 32 of varying diameters. First gripping member 16 is also connected to top portion 14a by attachment ribs 60 and 62. Attachment ribs 60 and 62 engage the edges of slot 48. Second gripping member 18 is also attached to top portion 14 by attachment ribs 64, 66, 68, and 70 which likewise engage the edges of slot 48. The gripping members 16 and 18 are flexible to allow their outer surfaces to conform to the sidewall of a cup holder. They also include a rubberized outer layer 17 and 19 which grips the sidewall 40 of the cup holder 32.

Figure 4:
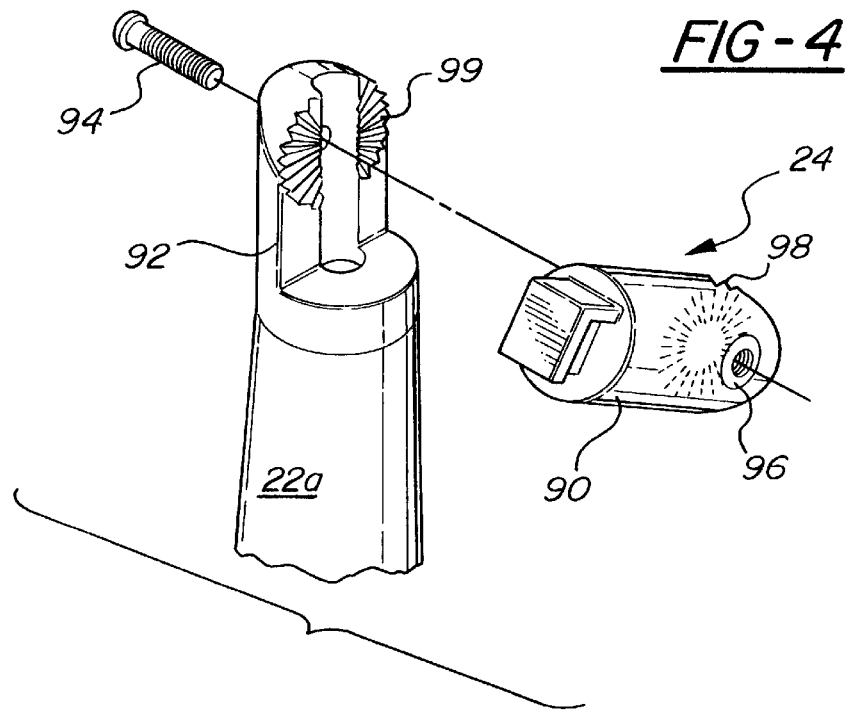
FIG. 4 is an exploded view of the adjustable connector portion of the device of FIG. 1.

Referring now to FIG. 4, details of the adjustable connector 24 are shown. The adjustable connector 24 includes an upper portion 90 which connects to bracket 20a and a lower portion 92 which is connected to or formed as part of elongated extension 22a. Upper and lower portions, 90 and 92, include intermeshing teeth 98 and 99 for defining a plurality of discreet relative positions between the portions 90 and 92. A threaded fastener 94 passes through lower portion 92 and into upper portion 90 engaging a threaded insert 96 in the upper portion 90. When the threaded fastener 94 is loose, the upper and lower portions 90 and 92 can be adjusted to change the angle of bracket 20a relative to elongated extension 22a. When the fastener 94 is tightened, upper and lower portions 90 and 92 are fixed relative to one another.

Referring now to FIG. 6, a portion of the base 12 is shown being inserted into a cupholder 32. In operation, gripping member 16 must be positioned to allow the gripping members to fit into the cupholder 32. The gripping member 16 can then be adjusted outwardly to engage the sidewall 40 of the cupholder 32.

Figure 7:
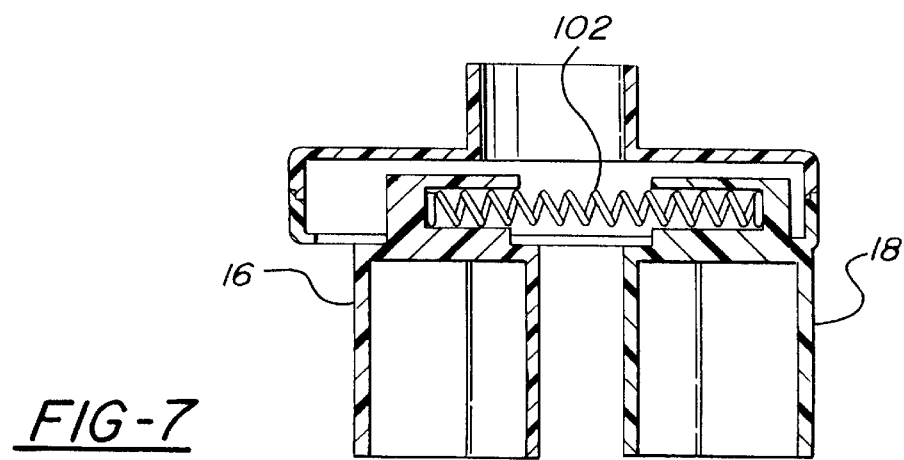
FIG. 7 is a cross-sectional view of a first alternative embodiment of the base of the device of FIG. 1.

Referring now to FIG. 7, an alternative embodiment of the adjusting device is shown. In place of the adjuster wheel 26 and threaded shaft 50, the embodiment shown includes a spring 102 which biases gripping members 16 and 18 away from one another.

Referring back to FIG. 2, it is envisioned that a variety of extensions 22a will be made to allow positioning of a phone 36 in a variety of positions relative to a cup holder 32. Alternatives to elongated extension 22a include shorter and longer extensions, offset extensions, and flexible extensions. One alternative embodiment of the elongated extension is shown as 22b. The extension 22b allows the position of adjustable connector 24b to be changed relative to plug 80 and then to be locked into place by tightening lock screw 28. An alternative to the frictional fit between plug 80 and internal bore 86 is to provide threads on each so that extension 22a could be twisted onto plug 80.

A variety of retaining brackets 20a are also envisioned to accommodate different phones 36. One alternative bracket is shown as 20b. Some embodiments of the present invention may include a bracket that consists of a small plate with attachment holes. Then, other adaptors can be fastened to the plate allowing the device to adjust to a variety of uses. A variety of brackets are currently available on the market and the present invention can be easily modified to accommodate many of them.

Gripping members 16 and 18 can also be modified within the scope of the present invention. The gripping members could extend at other than right angles to grip cupholders with angled sidewalls. The device may also have only a single gripping member. The gripping member could be molded to match the shape of a given cupholder eliminating the need for an adjusting device. The device could be constructed with one or more resilient gripping members that flex to accommodate the shape of a cupholder.

Having described the various embodiments of the present invention with reference to the accompanying figures, it will appreciated that various changes and modifications can be made without departing from the scope or spirit of the invention.

I claim:

1. A device for releasably retaining a cellular phone in a cup holder disposed in an automotive vehicle, the cup holder being configured to hold generally cylindrical beverage containers and having a generally circular cavity with a side wall, said device comprising:

a base disposable at least partially within the cup holder, said base including a top portion and a first and a second downwardly extending gripping member, each of said gripping members being adapted for insertion into the circular cavity and configured for gripping the side wall of the cup holder said base further comprising a means for moving at least one of said gripping members relative to said top portion and to the other gripping member, said base further comprising an elongated extension which extends upwardly from said top portion of said base when said base is disposed in the cupholder, said extension having an upper end and a lower end; and a cellular phone retaining bracket supported by said upper end of said extension and configured for releasably retaining a cellular phone.

2. The device according to claim 1 wherein said lower end of said elongated extension is detachably secured on said top portion of said base.

3. The device according to claim 2 wherein said base includes an adjustable connector; and said bracket is supported by said adjustable connector.

4. The device according to claim 1 wherein said top portion has a generally circular outer perimeter and is generally disposed within a plane;

said gripping members each project from said top portion at a right angle to the plane; said moving means comprising:
   at least one of said gripping members being adjustably attached to said top portion for movement in a line parallel to the plane; and
   said base further comprising an adjusting device for moving said at least one of said gripping members in the line outwardly toward said perimeter of said top portion.

5. A device according to claim 4 wherein said at least one of said gripping members includes an adjuster attachment portion with an internally threaded bore and said adjusting device comprises an externally threaded shaft supported by said base for rotation and engaging said threaded bore; and an adjuster wheel attached to said shaft for rotating said shaft, a portion of said wheel extending from said base for manipulation.

6. The device according to claim 1 wherein said gripping members each include a flexible outwardly facing surface that is generally curved for conforming to said side wall.

7. The device according to claim 1 wherein said gripping member includes a rubberized outer layer for gripping the side wall.

8. The device according to claim 1 wherein said bracket includes a detachable retaining portion configured for releasably retaining the cellular phone.

9. A device for releasably retaining a cellular phone in a cup holder disposed in an automotive vehicle, the cup holder being configured to hold generally cylindrical beverage containers and having a generally circular cavity with a side wall, said device comprising:

a base disposable at least partially within the cup holder, said base including a top portion and a first and a second downwardly extending gripping member, each of said gripping members being adapted for insertion into the circular cavity and configured for gripping the side wall of the cup holder said base further comprising a means for moving at least one of said gripping members relative to said top portion and to the other gripping member said base further comprising an adjustable connector said adjustable connector including an upper and a lower portion, said lower portion being connected to said top portion of said base, said upper and lower portions being capable of relative movement, said connector further including a locking device having a first position in which said portions are locked and a second position in which said portions are free for relative movement a cellular phone retaining bracket supported by and connected to said upper portion of said adjustable connector and configured for releasably retaining a cellular phone.

10. A device for releasably retaining a cellular phone in a cup holder disposed in an automotive vehicle, the cup holder being configured to hold generally cylindrical beverage containers and having a generally circular cavity with a side wall, said device comprising:

a base disposable at least partially within the cup holder, said base including a top portion and a first downwardly extending gripping member adapted for insertion into the circular cavity and configured for gripping the side wall of the cup holder, said base further including an adjustable connector including an upper portion and a lower portion, said lower portion being connected to said top portion of said base, said upper and lower portions being capable of relative movement, said upper and said lower portions each including a plurality of intermeshing teeth for defining a plurality of discrete relative positions, said connector further including a locking device having a first position in which said upper and lower portions are locked and a second position in which said upper and lower portions are free for relative movement; and a cellular phone retaining bracket supported by said base and configured for releasably retaining a cellular phone, said bracket being connected to said upper portion of said adjustable connector.

* * * * *

UNITED STATES PATENT AND TRADEMARK OFFICE
CERTIFICATE OF CORRECTION

PATENT NO. : 6,062,518
DATED : May 16, 2000
INVENTOR(S) : T. Gerald Etue

It is certified that error appears in the above-identified patent and that said Letters Patent are hereby corrected as shown below:

Column 4, line 34 - Replace " 86" with --86a--

Column 4, line 57- Replace "appreciated" with --be appreciated---

Signed and Sealed this

Tenth Day of April, 2001

*Attest:*

NICHOLAS P. GODICI

*Attesting Officer*    *Acting Director of the United States Patent and Trademark Office*